United States Patent
Bierhuizen et al.

(10) Patent No.: US 6,578,968 B1
(45) Date of Patent: Jun. 17, 2003

(54) IMAGE PROJECTION SYSTEM HAVING AN EXTRA OPTICAL SYSTEM FOR AT LEAST PARTLY RE-ILLUMINATING THE IMAGE DISPLAY SYSTEM

(75) Inventors: Serge Joel Armand Bierhuizen, Wilsonville, OR (US); Adrianus Johannes Stephanes Maria De Vaan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 86 days.

(21) Appl. No.: 09/671,412

(22) Filed: Sep. 27, 2000

(30) Foreign Application Priority Data

Sep. 29, 1999 (EP) ............................................. 99203174

(51) Int. Cl.$^7$ ......................... G03B 21/26; G03B 21/00; G03B 21/14; G02F 1/1335
(52) U.S. Cl. ........................... 353/30; 353/31; 353/122; 353/20; 353/37; 353/97
(58) Field of Search .............................. 353/31, 33, 34, 353/37, 84, 97, 98, 122, 30, 20; 349/5, 6, 7, 8

(56) References Cited

U.S. PATENT DOCUMENTS

| | | | | |
|---|---|---|---|---|
| 3,800,149 A | * | 3/1974 | Lang ........................ 205/205 |
| 5,061,049 A | | 10/1991 | Hornbeck ................... 359/224 |
| 5,098,184 A | | 3/1992 | Van Den Brandt et al. . 353/102 |
| 5,241,170 A | * | 8/1993 | Field, Jr. et al. ...... 250/214 VT |
| 6,028,660 A | * | 2/2000 | Van Der Laan et al. ...... 355/67 |
| 6,133,986 A | * | 10/2000 | Johnson ........................ 355/67 |
| 6,139,157 A | * | 10/2000 | Okuyuma .................... 353/102 |
| 6,179,425 B1 | * | 1/2001 | De Vaan ...................... 353/38 |
| 6,231,190 B1 | * | 5/2001 | Dewald ........................ 353/31 |
| 6,247,816 B1 | * | 6/2001 | Cipolla et al. ................. 353/31 |
| 6,347,014 B1 | * | 2/2002 | Hayashi et al. ............. 359/634 |
| 6,356,700 B1 | * | 3/2002 | Strobl ......................... 385/147 |

FOREIGN PATENT DOCUMENTS

EP    0467447 A1    1/1992    ............ G02B/5/30

* cited by examiner

*Primary Examiner*—Russell Adams
*Assistant Examiner*—Melissa J Koval

(57) ABSTRACT

An image projection system includes an illumination system and an image display system with at least one reflective image display panel for modulating. An illumination beam is supplied by the illumination system with image information and a projection lens system. The illumination system has an extra optical system that at least partly re-illuminates the image display system with light reflected by the reflective image display panel to the illumination system. The extra optical system redistributes light coming from a pixel of the image display system across a plurality of pixels of the image display system.

2 Claims, 3 Drawing Sheets

000
IMAGE PROJECTION SYSTEM HAVING AN EXTRA OPTICAL SYSTEM FOR AT LEAST PARTLY RE-ILLUMINATING THE IMAGE DISPLAY SYSTEM

FIELD OF TECHNOLOGY

The invention relates to an image projection system comprising, in this order, an illumination system, an image display system with at least one reflective image display panel for modulating, an illumination beam to be supplied by the illumination system with image information, and a projection lens system.

BACKGROUND AND SUMMARY

An image projection system of the type described in the opening paragraph is known, for example, from U.S. Pat. No. 5,905,545. The image projection system described in this specification comprises an illumination system for supplying an illumination beam, and an image display system with reflective image display panels for modulating this light beam in conformity with image information to be projected. The display panel may be, for example, a digital micromirrored display (DMD) with a two-dimensional array of reflective digital light switches which are driven by means of electrodes. Small mirrors for each pixel are used to switch a pixel on or off by changing an angle of the mirrors. The pixels of the DMD can maintain their 'on' or 'off'-state for controlled display times. To achieve intermediate levels of illumination between white and black, pulse-width modulation techniques are used. In the reflective DMD projection systems, the part of the light modulated by the display panel, which part must give rise to dark pixels in the image, is deflected from the light path by the reflective switches and absorbed in the optical system and is thus lost. This is at the expense of the peak brightness in the image.

It is an object of the present invention to provide an image projection system in which a relatively high peak brightness is realized.

This object is achieved by the image projection system according to the invention, which is characterized in that the illumination system comprises an extra optical system for at least partly re-illuminating the image display system with the light reflected by the image display system to the illumination system, the extra optical system comprising means for redistributing light coming from a pixel of the image display system across a plurality of pixels of the image display system.

The present invention relates to a reflective projection system in which light is incident on the display panel and modulated by the display panel before it is projected. The invention is based on the recognition that the light which is modulated by a pixel representing a dark or grey pixel in the image is deflected from the light path but is not absorbed in the display system and is again sent towards the entrance of the optical display and thus recuperated. This light will as yet have an opportunity of being incident on a pixel representing a bright pixel. In the image projection system described above, the light intended for dark or grey pixels is thus not lost but is re-used. Furthermore, to prevent ghost images from being produced during this reuse, the illumination system is provided with means for redistributing of the light.

A preferred embodiment of the image projection system according to the invention is characterized in that the extra optical system comprises a lens element and an optical fiber, the lens element being situated between an element of the reflective image display panel and an input of the optical fiber for concentrating reflected light in the optical fiber. In this way, the reflected light which is not used to form a projection image can be efficiently transported back to the illumination system. Total internal reflection in the optical fiber redistributes the recuperated light.

A further embodiment of the image projection system according to the invention is characterized in that the extra optical system comprises an optical wedge for combining the light from the radiation source and the reflected light from the reflective image display panel.

A further embodiment of the image projection system according to the invention is characterized in that the extra optical system comprises an integrating rod for receiving light from an element of the reflective image display panel, and reflecting means situated at one side of the integrating rod for reflecting the received light back to the image display panel. In this way, the integrating rod acts as a non-imaging mirror device which homogeneously distributes the light on the image display device so that small distortions are reduced in the projected picture.

A further embodiment of the image projection system according to the invention is characterized in that the image projection system comprises a further reflective image display panel for modulating a second beam provided by the illumination system, and the extra optical system comprises means for recombining the light reflected from both the reflective image display panel and the further reflective image display panel. For example, a dichroic mirror may be used to recombine the light of different colors from the respective reflective image display panels into a single light beam which can be directed to the illumination system.

BRIEF DESCRIPTION OF THE DRAWINGS

These and other aspects of the invention are apparent from and will be elucidated with reference to the embodiments described hereinafter.

In the drawings.

DETAILED DESCRIPTION OF THE PREFERRED EMBODIMENT

Figure 1:
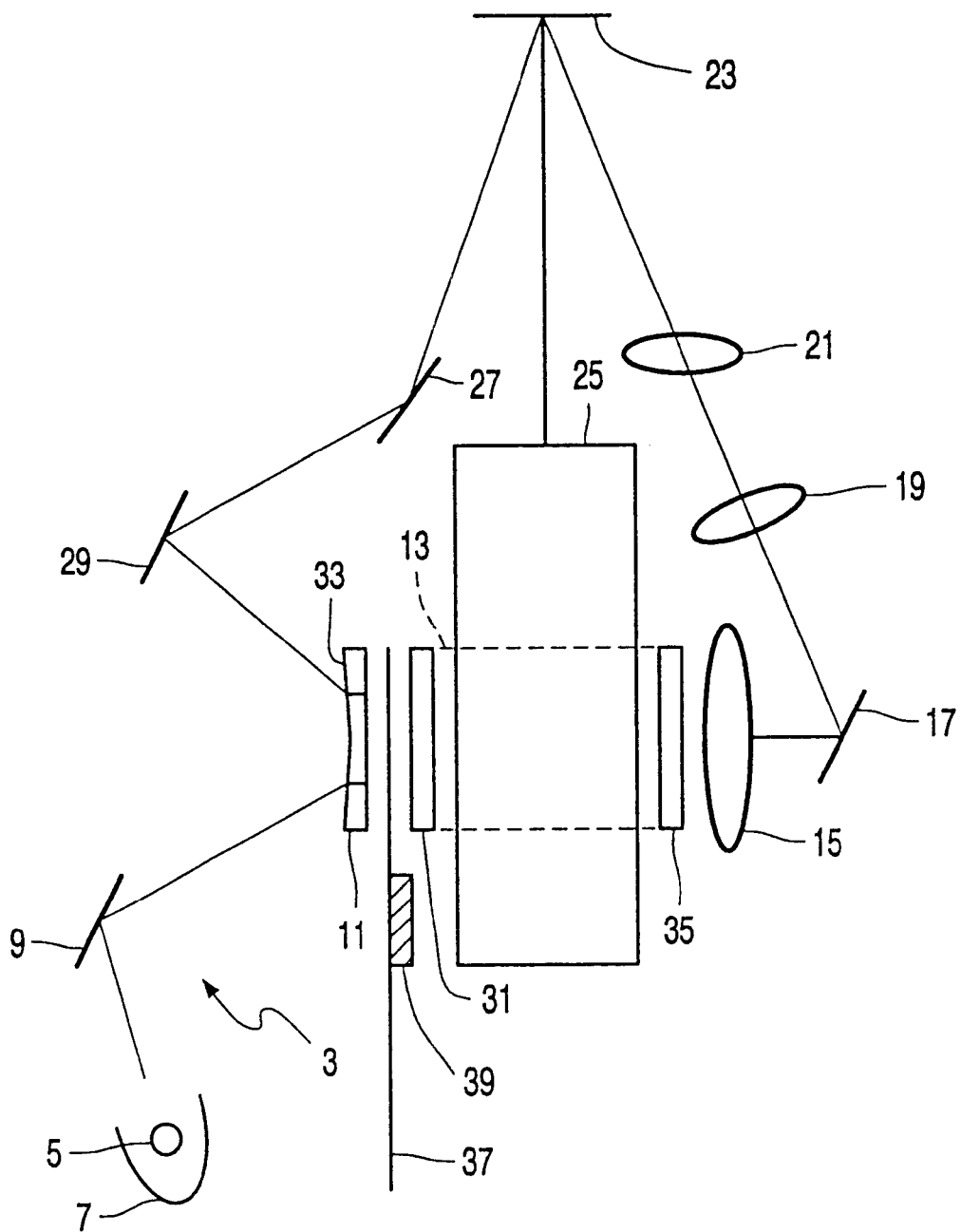
FIG. 1 shows a first embodiment of an image projection system according to the invention.

The image projection system 1 shown in FIG. 1 comprises an illumination system 3 for supplying an illumination beam. The illumination system 3 comprises a radiation source 5 and a reflector 7. The reflector 7 at least partly surrounds the radiation source 5 and ensures that the greater part of the light emitted by the radiation source in a direction away from the system as yet reaches the system.

The illumination beam generated by the illumination system 3 is incident on the display system, represented for the sake of simplicity by a single image display panel 23, and is modulated thereby in conformity with the image information to be displayed. The light modulated and reflected by the display panel is projected on a screen (not shown) by means of a projection lens system represented for the sake of simplicity by a single projection lens 25.

In FIG. 1, light coming from the illumination system 3 is sent via a second reflector 9, a first optical wedge 11, an integrator system 13, a first lens 15, a folding mirror 17 and first and second relay lenses 19,21 towards the reflective image display panel, for example a digital mirrored display (DMD) panel 23. DMD devices are known per se from U.S. Pat. No. 5,061,049. The mirrors of the DMD image display panel 23 reflect the light either to the pupil of the projection lens 25 or to the entrance of an extra optical system in dependence on the voltage applied across the electrodes. The extra optical system comprises, for example, in said order, an entrance mirror 27, a third relay mirror 29 and a second optical wedge 33. The applied voltage controls the angle of the micro-mirrors of the DMD device in conformity with the image information to be displayed. The mirrors of the DMD image display panel 23 can be set to two different states, an on-state and an off-state. The on-state of the mirror is situated, for example, at 10 degrees with respect to a normal on the DMD image display panel 23 and the off-state of the mirror is situated, for example, at −10 degrees with respect to the normal. In the on-state, a light beam impinging on the mirrors of the DMD image display panel 23 at an angle of 20 degrees with respect to the normal is reflected in a direction coincident with the normal. In the off-state, the light beam impinging on the mirrors of the DMD image display panel 23 at an angle of 20 degrees is reflected at an angle of 40 degrees with respect to the normal. This difference is sufficient for a skilled person to dimension the optical elements of the system so as to direct the light in the pupil of the projection lens 25 in the on-state of the mirrors and away from the pupil of the projection lens in the off-state of the mirror. The present invention proposes to provide the illumination system with the extra optical system for at least partly re-illuminating the DMD image display panel 23 with light reflected by the DMD image display panel. Here, light is concerned which is reflected by display elements representing dark or grey pixels in the image. The extra optical system comprises means for redistributing light coming from such a display element across a plurality of display elements. In known systems, the light reflected by such display elements is reflected from the light path by the DMD display panel 23 and is thus lost. In the image projection system according to the invention, this light is recuperated and is given another opportunity of being incident on display elements, giving rise to bright pixels in the image. In operation, in the off-state, the entrance mirror 27 directs the light coming from pixels of the display panel representing dark pixels in the image via the third relay mirror 29 and the second optical wedge 33 towards the entrance of the light-integrating system 13.

The extra optical system may alternatively comprise, in said order, an entrance lens and an optical light guide, for example, an optical fiber made of plastic or glass.

In the embodiments of the image projection system according to the invention, shown in FIG. 1, the illumination system may not only comprise a radiation source and a reflector, but also an integrator system. The first lens 15 behind the integrator system ensures that all re-images are superimposed in the plane of the DMD image display panel.

The integrator system 13 comprises a first lens plate 31 and a second lens plate 35 and ensures a homogeneous illumination of the display panel 23. For a detailed description of the principle of an integrator system with two lens plates, reference is made to U.S. Pat. No. 5,098,184.

Instead of two integrator plates, the integrator system may alternatively comprise a bar-shaped integrator. The illumination system is then made uniform by multiple total internal reflection on the side walls of the bar. The bar may be in the form of, for example, a quartz bar.

The display panel is, for example, a display panel which is sequentially illuminated with a red, a green and a blue beam, while it is simultaneously driven with the image having the color of the corresponding illumination. The extra optical system may also comprise, in said order, an integrating rod and a reflective means. An image projection system comprising such an extra optical system is discussed with reference to FIG. 2.

Figure 2:
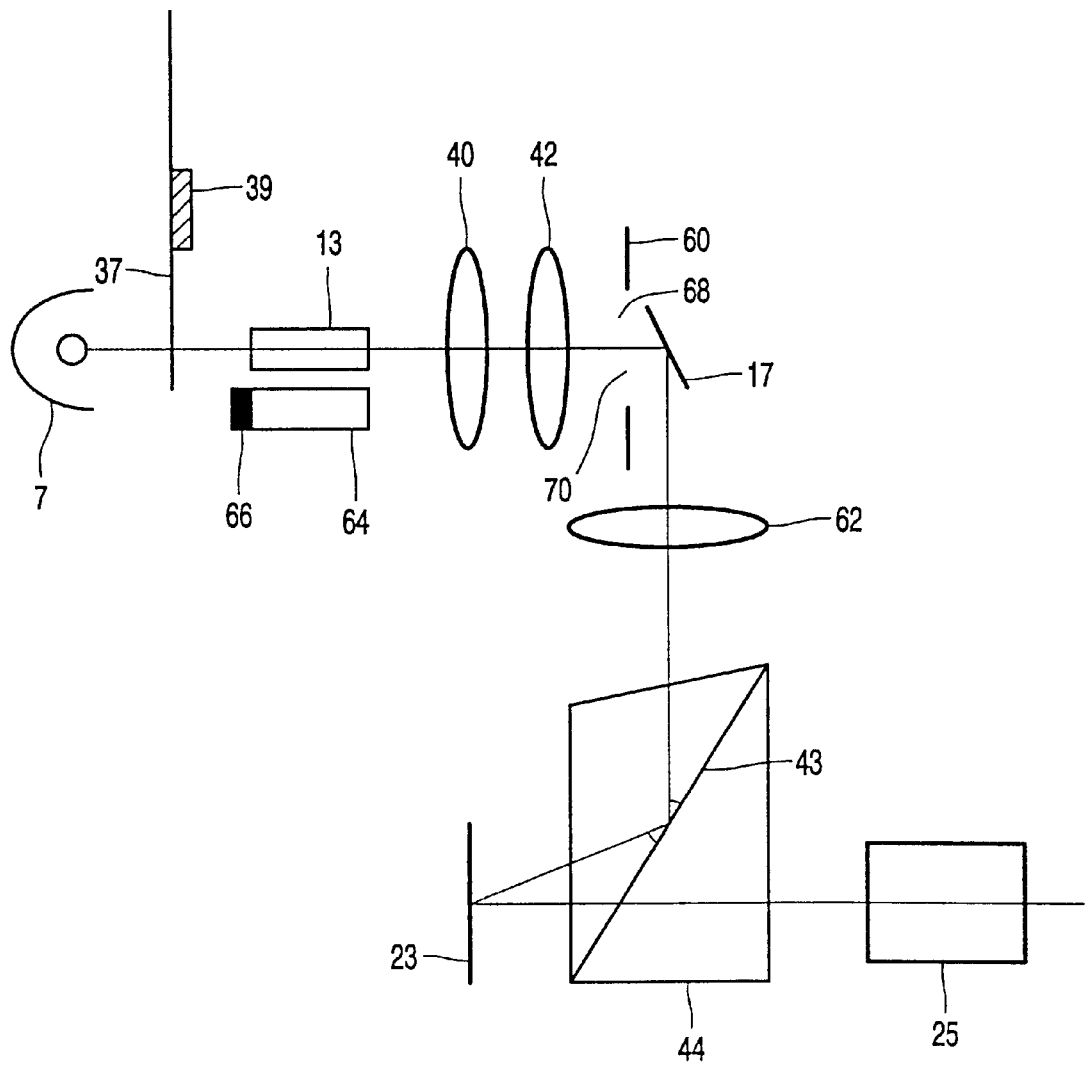
FIG. 2 shows a second embodiment of an image projection system comprising two integrating rods and FIG. 3 shows a third embodiment of an image projection system comprising two reflective image display panels.

The image projection system 1 shown in FIG. 2 comprises an illumination system 3 for supplying an illumination beam. The illumination system 3 comprises a radiation source 5 and a reflector 7. The reflector 7 at least partly surrounds the radiation source 5 and ensures that the greater part of the light emitted by the radiation source in a direction away from the system as yet reaches the system.

The illumination beam generated by the illumination system 3 is incident on the display system, represented for the sake of simplicity by a single image display panel 23, and is modulated thereby in conformity with the image information to be displayed. The light modulated and reflected by the display panel is projected on a screen (not shown) by means of a projection lens system represented for the sake of simplicity by a single projection lens 25.

In FIG. 2, light coming from the illumination system 3 is sent via an integrator system, for example, a quartz rod 13, a pair of relay lenses 40,42, an aperture stop 60, a folding mirror 17, a third relay lens 62 and a total internal reflection (TIR) prism 44 towards the reflective image display panel, for example a DMD image display device 23. The mirrors of the DMD image display device 23 are designed to be set at two different states. In the on-state, the mirrors of the DMD image display device 23 are designed to reflect the light beam in such a way that the reflected light beam entering the TIR prism 44 is transmitted to the projection lens 25. In the off-state, the mirrors of the DMD are designed to reflect the incident light beam from a reflective image element back into the direction of incidence. The light is then reflected via an interface 43 of the TIR prism 44 back to the illumination system 3. By tilting the DMD image display device 23, the reflected light beam can be directed to the entrance of a second integrating rod 64 near the first integrating rod 13. The other entrance of the second integrating rod 64 is provided with a reflective means, for example a reflective coating 66 for reflecting the reflected light beam back to the display system. The second integrating rod 64 and the reflective coating 66 are part of the extra optical system for redistribution of the light coming from pixels of the image display system across the pixels of the DMD image display device 23, and, as a result, the peak brightness of the image projection device is increased. The relay lenses 40,42,62 are designed in such a way that the reflected light beam creates an image of the aperture stop 70 in the same plane as the aperture stop 68. Furthermore, the reflective DMD display panel may be, for example, sequentially illuminated with a red, a green and a blue beam, while the display panel 23 is simultaneously driven with the image having the color of the corresponding illumination. Therefore, the illumination system 3 preferably comprises a color wheel 37 driven by a motor 39 for alternately providing the red, green and blue light beams.

Figure 3:
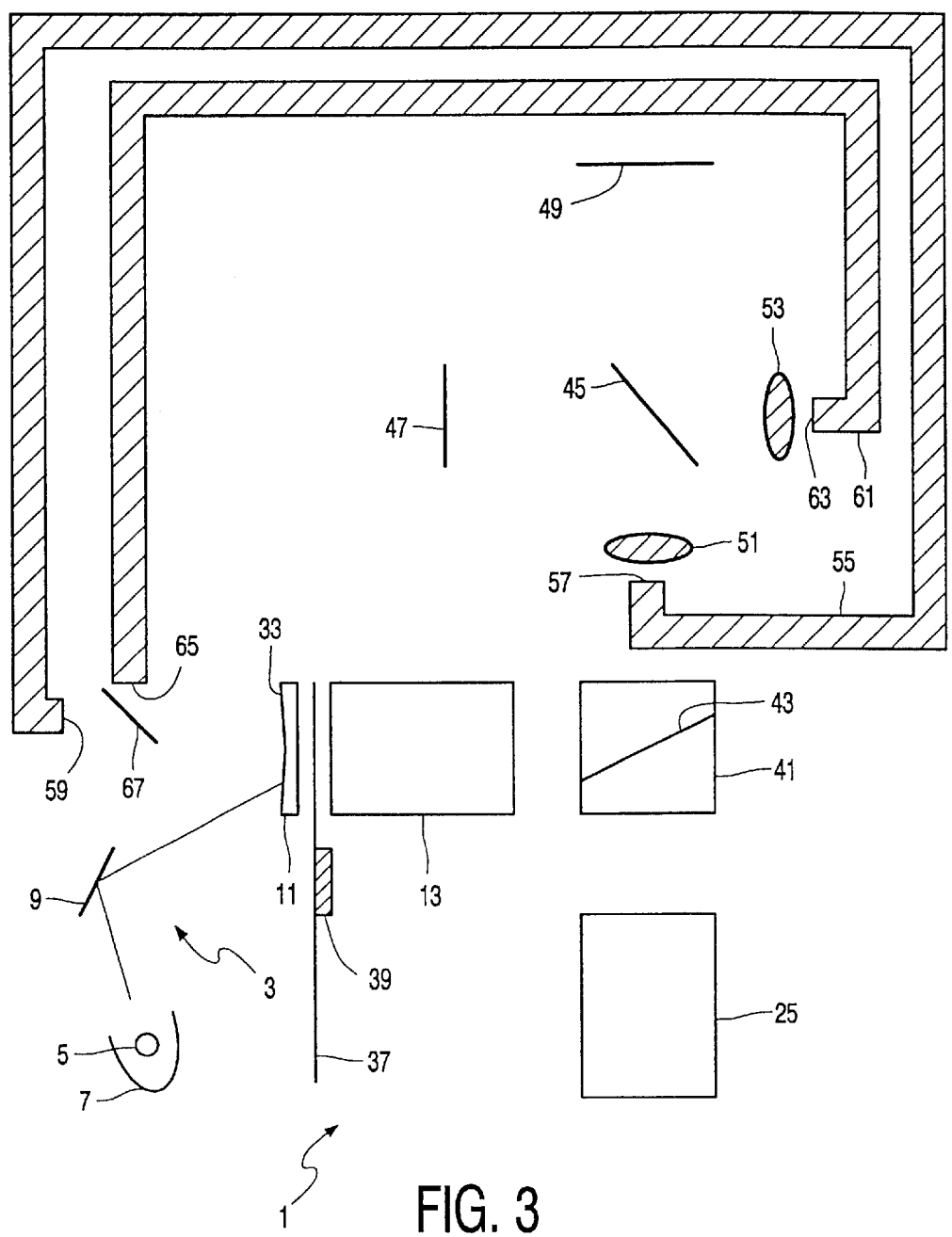

The image projection system may alternatively comprise two or three display panels. An embodiment using two display panels is shown in FIG. 3. The image projection system comprises an illumination system comprising, in said order, a radiation source 5, a reflector 7, an optical wedge 11, an integrating system, for example an optical bar 13, a total internal reflection (TIR) prism 41, a dichroic mirror 45 for reflecting radiation with a wavelength in the red range and passing radiation in the green and blue ranges, a first reflective image display panel 47 and a second reflective image display panel 49, for example DMD image display panels and a projection lens 25. Furthermore, in accordance with the invention, the image projection system comprises an extra optical system for recuperating the light reflected by the first and second DMD image display panels 47,49 in the illumination system. This extra optical system comprises, in said order, the coupling lenses 51,53, optical light guides 55,61, for example, an optical fiber made of glass or plastic, and a dichroic mirror 67 for combining the reflected light from the respective first and second DMD image display panels 47,49 in a single beam. In operation, light from the illumination system 3 is coupled into the integrating system 13, for example an optical rod, via the optical wedge 11 and a rotating color wheel 37 driven by a motor 39 for alternating providing yellow and magenta light beams. The optical rod 13 homogeneously distributes the light and directs the light to the total internal reflection (TIR) prism 41. Since the angle of incidence of the incoming light at the interface 43 of the TIR prism 41 is larger than the critical angle, the prism reflects the light towards the first dichroic mirror 45. The TIR prism 41 is situated with respect to the incoming light beam in such a way that the light beam can be properly switched by the rotary action of the mirrors of the DMD image display panels 47,49. The first dichroic mirror 45 continuously reflects red light with a wavelength in the red range towards the first DMD image display panel 47 and alternately passes the green or blue light with wavelengths in the green or blue range, respectively, towards the second DMD image display panel 49. The first DMD image display panel 47 modulates the red light, in conformity with the image information to be displayed, by reflecting the light via the dichroic mirror 45 and the TIR prism 41 in the pupil of the projection lens 25 for projection on a screen (not shown) or via the first lens 51 in the entrance pupil 57 of the first optical fiber 55 for recuperating the light which is not used for projection. The second reflective image display panel 49 alternately modulates the green or blue light simultaneously with the rotating color wheel 37 and in conformity with the image information to be displayed. The rotary action of the mirrors of the second DMD image display panel 49 directs the green or blue light via the first dichroic mirror 45 and the TIR prism 41 in the entrance pupil of the projection lens 25 for projection on the screen (not shown) or via the second lens 53 in the entrance pupil 63 of the second optical fiber 61 for recuperating the light not used for projection. The optical fibers 55,61 transport the red light and the respective green or blue light back to the illumination system. The second dichroic mirror 67 combines the red light coming from the output 59 of the first optical fiber 55 with the respective green or blue light coming from the output 65 of the second optical fiber 61. The combined light is then fed back into the illumination system by the optical wedge 33. By providing the image projection system with an integrator system (13) and an optical system (51,53,55,61,67) as described above, the light coming from pixels representing dark pixels in the image will be recuperated, as described above with reference to a single DMD image display panel and, as a result, the peak brightness of the projected image is increased.

Instead of DMD image display panels, also other reflective image display panels may be used in the projection system according to the invention, for example, an actuated mirror array (AMA) image display panel known per se from the U.S. Pat. No. 5,729,386.

Furthermore, a reflective liquid crystal image display panel may be used. When a liquid crystal display panel is used, the illumination system should provide a polarised light beam for illumination of the display system. Furthermore, an analyzer has to be situated between the liquid crystal display panel and the projection screen.

It is to be noticed that the integrating system may be omitted to save costs in exchange for image homogeneity.

It should be noted that the above-mentioned embodiments illustrate rather than limit the invention, and that those skilled in the art will be able to design many alternative solutions without departing from the scope of the claims.

What is claimed is:

1. An image projection system comprising, in this order, an illumination system and an image display system with at least one reflective image display panel for modulating, an illumination beam to be supplied by the illumination system with image information and a projection lens system, wherein the illumination system includes an extra optical system for at least partly re-illuminating the image display system with light reflected by the reflective image display panel to the illumination system, the extra optical system including means for redistributing light coming from a pixel of the image display system across a plurality of pixels of the image display system, in which the illumination system includes an integrator system, and the extra optical system includes a lens element and an optical fiber, the lens element being situated between an element of the reflective image display panel and an input of the optical fiber.

2. The image projection system of claim 1, wherein the extra optical system comprises an optical wedge for combining the illumination beam and the reflected light from the reflective image display panel.

* * * * *